(12) United States Patent
Yeo et al.

(10) Patent No.: US 7,938,512 B2
(45) Date of Patent: May 10, 2011

(54) METHODS AND SYSTEMS FOR LASER PROCESSING

(75) Inventors: Jong-Souk Yeo, Corvallis, OR (US);
Mark Huth, Corvallis, OR (US);
Mehrgan Khavari, Corvallis, OR (US);
Alexey S Kabalnov, Corvallis, OR (US);
Craig M. Gates, Corvallis, OR (US);
Sean P Mcclelland, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1191 days.

(21) Appl. No.: 11/566,586

(22) Filed: Dec. 4, 2006

(65) Prior Publication Data
US 2007/0090088 A1    Apr. 26, 2007

Related U.S. Application Data

(62) Division of application No. 10/850,732, filed on May 21, 2004, now Pat. No. 7,163,640.

(51) Int. Cl.
*B41J 2/05* (2006.01)

(52) U.S. Cl. ............... 347/65; 347/20; 347/56

(58) Field of Classification Search .......... 347/20, 347/51–52, 56–59, 61–65, 67
See application file for complete search history.

(56) References Cited

U.S. PATENT DOCUMENTS

| | | | |
|---|---|---|---|
| 4,437,109 A | 3/1984 | Anthony et al. | |
| 4,766,009 A | 8/1988 | Imura et al. | |
| 5,468,652 A | 11/1995 | Gee | |
| 5,543,365 A | 8/1996 | Wills et al. | |
| 6,117,706 A | 9/2000 | Yoshioka et al. | |
| 6,392,683 B1 * | 5/2002 | Hayashi | 347/224 |
| 6,527,368 B1 * | 3/2003 | Giri et al. | 347/44 |
| 7,163,640 B2 | 1/2007 | Yeo | |
| 2004/0140534 A1 | 7/2004 | Yoshihara et al. | |
| 2004/0159951 A1 | 8/2004 | Toyoda et al. | |

FOREIGN PATENT DOCUMENTS

| | | |
|---|---|---|
| DE | 3937460 | 11/1990 |
| DE | 19856346 | 6/2002 |
| EP | 1293316 | 3/2003 |
| EP | 1533069 | 5/2005 |
| WO | WO8903274 | 4/1989 |

* cited by examiner

*Primary Examiner* — Juanita D Stephens (57) ABSTRACT

The described embodiments relate to slotted substrates. One exemplary method forms a feature into a substrate, at least in part, by directing a laser beam at the substrate. During at least a portion of said directing, the method supplies a conductive material proximate the substrate.

32 Claims, 9 Drawing Sheets

METHODS AND SYSTEMS FOR LASER PROCESSING

CROSS-REFERENCE TO RELATED APPLICATION

This application is a divisional of U.S. utility application entitled, "Methods and Systems for Laser Processing," having Ser. No. 10/850,732, filed May 21, 2004, now U.S. Pat. No. 7,163,640, which is entirely incorporated herein by reference.

BACKGROUND

The market for electronic devices containing integrated circuits continually demands increased performance at decreased costs. To satisfy these demands various production techniques are employed to produce integrated circuits.

Integrated circuits comprise a substrate over which other various layers are positioned to form the integrated circuit. Various substrate removal techniques can be utilized during processing. One production technique involves laser machining to selectively remove substrate material. Such laser machining can be useful in various production applications including forming slotted substrates configured for incorporation into various fluid-ejecting devices. Such fluid-ejecting devices can be adapted to various applications including print heads for ink jet print cartridges, as well as various other laboratory and medical applications.

Laser machining can also be useful in other production applications, such as dicing of wafers into individual substrates. While laser machining is a useful production technique, present laser machining techniques can cause incidental damage to component layers positioned on a substrate during laser processing. Thus a need exists for improved laser processing technologies.

BRIEF DESCRIPTION OF THE DRAWINGS

The same components are used throughout the drawings to reference like features and components wherever feasible. Alphabetic suffixes are utilized to designate different embodiments. The illustrations described below are schematic representations of exemplary devices and methods of manufacture. It should be understood that the illustrations may not be to scale and certain dimensions may be exaggerated or reduced in the interests of clarity.

DETAILED DESCRIPTION OF THE PREFERRED EMBODIMENTS

The embodiments described below pertain to methods and systems for laser processing of integrated circuits. The integrated circuits comprise a substrate having various layers positioned thereon. Laser processing can be utilized to form a feature such as a slot, trench or other through or blind feature, within an individual integrated circuit. Alternatively or additionally, laser processing can be utilized to separate integrated circuits from one another. The embodiments described below allow the laser machining process to produce high quality substrates and associated layers.

Figure 1:
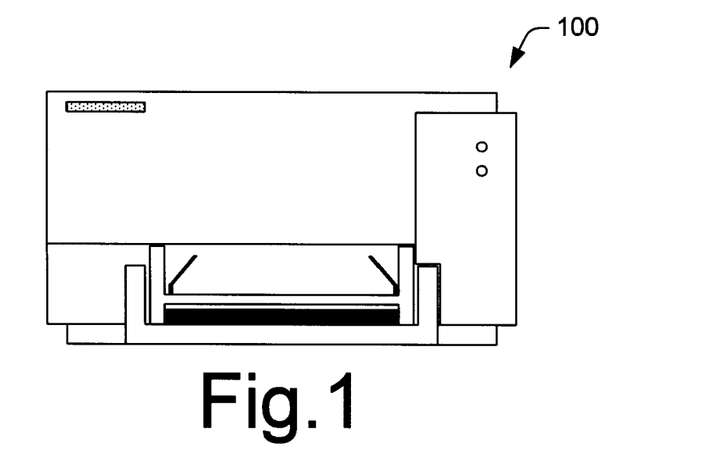
FIG. 1 illustrates a front elevational view of a diagrammatic representation of an exemplary printer in accordance with one exemplary embodiment.

FIG. 1 illustrates a diagrammatic representation of an exemplary printing device that can utilize an exemplary print cartridge. In this embodiment, the printing device comprises a printer 100. The printer shown here is embodied in the form of an inkjet printer. The printer 100 can be capable of printing in black-and-white and color. The term "printing device" refers to any type of printing device and/or image forming device that employs slotted substrate(s) to achieve at least a portion of its functionality. Examples of such printing devices can include, but are not limited to, printers, facsimile machines, and photocopiers. In this exemplary printing device, the slotted substrates comprise a portion of a print head which is incorporated into a print cartridge, an example of which is described below.

Figure 2:
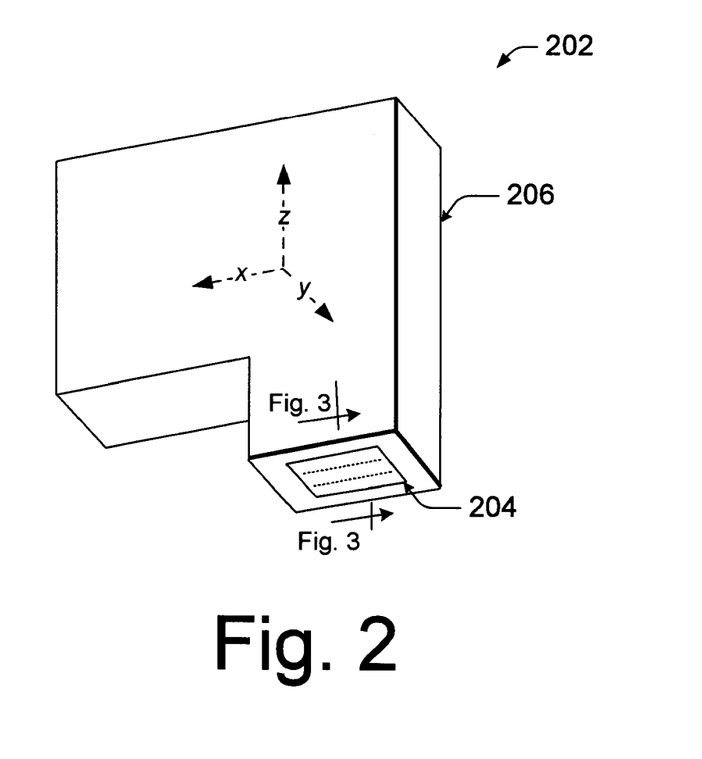
FIG. 2 illustrates a perspective view of a diagrammatic representation of a print cartridge suitable for use in the exemplary printer shown in FIG. 1 in accordance with one exemplary embodiment.

FIG. 2 shows a diagrammatic representation of an exemplary print cartridge 202 that can be utilized in an exemplary printing device. The print cartridge is comprised of a print head 204 and a cartridge body 206 that supports the print head. Print head 204 comprises an example of an integrated circuit in the form of a fluid-ejecting device. Though a single print head 204 is employed on this print cartridge 202 other exemplary configurations may employ multiple print heads on a single cartridge.

Print cartridge 202 is configured to have a self-contained fluid or ink supply within cartridge body 206. Other print cartridge configurations may alternatively or additionally be configured to receive fluid from an external supply. Other exemplary configurations will be recognized by those of skill in the art.

Reliability of print cartridge 202 is desirable for proper functioning of printer 100. Further, failure of print cartridges and/or defective print cartridges increases production costs. Print cartridge failure can be brought about by defective or faulty print cartridge components. Such component failure can be caused by among other factors damage to print cartridge components during manufacture. As such, various embodiments described below can provide print heads with a reduced propensity for failure.

Figure 3:
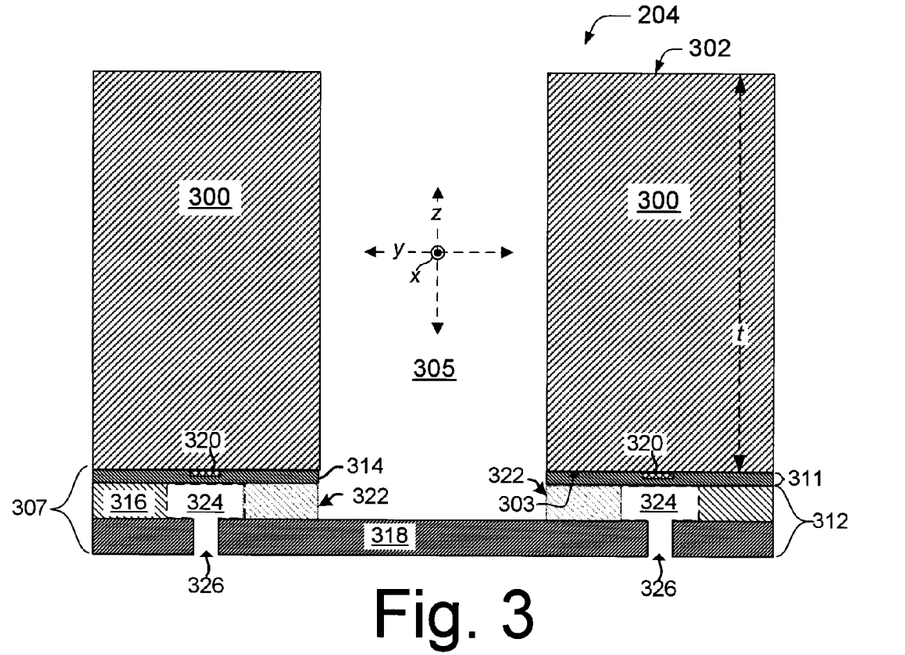
FIG. 3 illustrates a diagrammatic representation of a side-sectional view of a portion of the print cartridge shown in FIG. 2 in accordance with one exemplary embodiment.

FIG. 3 shows a cross-sectional diagrammatic representation of a portion of the exemplary print head 204, taken along line 3-3 in FIG. 2. Here, a substrate 300 extends between a first substrate surface ("first surface") 302 and a second substrate surface ("second surface") 303 to define a thickness t there between. A slot 305 passes through substrate 300 between first and second surfaces 302, 303. The view of FIG. 3 is taken transverse an x-axis of slot 305. In this embodiment the x-axis comprises a long axis extending into and out of the plane of the page upon which FIG. 3 appears.

In one embodiment, substrate 300 comprises silicon which can be either doped or undoped. Other suitable substrate materials can include, but are not limited to, gallium arsenide, gallium phosphide, indium phosphide, glass or other material.

Substrate thicknesses t can have any suitable dimensions that are appropriate for substrates' intended applications. In some embodiments, substrate thicknesses taken relative to the z-direction can range from less than 100 microns to more than 2000 microns. One exemplary embodiment can utilize a substrate that is approximately 675 microns thick. Though a single substrate is discussed herein, other suitable embodiments may comprise a substrate that has multiple components during assembly and/or in the finished product. For example, one such embodiment may employ a substrate having a first component and a second sacrificial component which is discarded at some point during processing.

A layer assembly 307 comprising one or more layers is formed over the second surface 303 of the substrate. In some embodiments, layer assembly 307 comprises a first sub-assembly 311 of one or more layers, and a second sub-assembly 312 of one or more layers. In this particular example, first sub-assembly 311 comprises one or more thin-film layers 314, and second sub-assembly 312 comprises one or more thick-film layers, which in one embodiment comprise a photo-imagable polymer. Other suitable examples are provided below. In at least one embodiment, the second sub-assembly 312 comprises a barrier layer 316 and an orifice plate or orifice layer 318.

In one embodiment, one or more thin-film layers 314 can be patterned to comprise one or more electrical components such as electrical traces (not specifically shown) resistors 320 and transistors (not specifically shown). Individual resistors can be selectively controlled via the electrical traces. Thin-film layers 314 can in some embodiments also define, at least in part, a wall or surface of multiple fluid-feed passageways 322 through which fluid can pass. Barrier layer 316 can define, at least in part, multiple firing chambers 324. In some embodiments, barrier layer 316 may, in combination with thin-film layers 314, define fluid-feed passageways 322. Orifice layer 318 can define multiple firing nozzles 326. Individual firing nozzles can be respectively aligned with individual firing chambers 324.

Barrier layer 316 and orifice layer 318 can be formed in any suitable manner. In one embodiment, both barrier layer 316 and orifice layer 318 comprise thick-film material, such as a photo-imagable polymer material. The photo-imagable polymer material can be applied in any suitable manner. For example, the material can be "spun-on" as will be recognized by the skilled artisan.

After being spun-on, barrier layer 316 can then be patterned to form, at least in part, desired features, such as firing chambers 324, therein. In one embodiment, patterned areas of the barrier layer can be filled with a sacrificial material. In this embodiment, orifice layer 318 can be comprised of the same material as the barrier layer and be formed over barrier layer 316. In one such example, orifice layer material is 'spun-on' over the barrier layer. Orifice layer 318 can then be patterned as desired to form nozzles 326 over respective chambers 324. The sacrificial material is then removed from the barrier layer's chambers 324 and passageways 322.

In another embodiment, barrier layer 316 comprises a thick-film, while the orifice layer 318 comprises an electro-formed nickel material. Other suitable embodiments may employ an orifice layer which performs the functions of both a barrier layer and an orifice layer.

In operation, fluid such as ink can enter slot 305 from the cartridge body, shown FIG. 2. Fluid can then flow through individual passageways 322 into an individual chamber 324. Fluid can be ejected from the chamber when an electrical current is passed through an individual resistor 320. The electrical current can heat the resistor sufficiently to vaporize some of the fluid contained in the firing chamber so that it expands to eject a portion of the remaining fluid from a respectively positioned nozzle 326. The ejected fluid can then be replaced by additional fluid from passageway 322.

FIGS. 4a-4f illustrate production techniques for producing an exemplary print head similar to print head 204 shown in FIG. 3. The skilled artisan should recognize that the production techniques described below are equally applicable to other types of fluid-ejecting devices or other microelectronic devices in which features are formed.

Figure 4A:
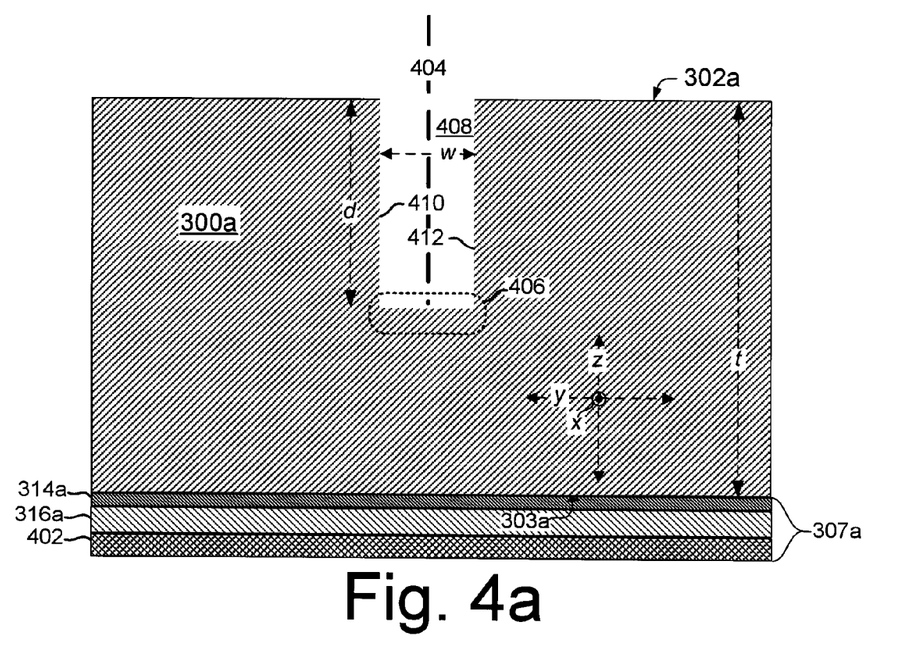
FIGS. 4a-4f illustrate diagrammatic representations of process steps for laser processing an exemplary slotted substrate in accordance with one embodiment.

Referring to FIG. 4a, fabrication of an exemplary print head begins with a substrate 300a. Various characteristics of the substrate are described above. Various thin-film layers 314a are positioned over second surface 303a in a manner known in the art to form various electrical components. In some embodiments, the thin-film layers 314a comprise at least one patterned conductive layer and at least one dielectric layer. In other embodiments thin-film layers 314a may include anti-cavitation and/or other protective layers as are known in the art.

Positioned over thin-films 314a is barrier layer 316a. The barrier layer may be patterned at this point to form the various firing chambers described above in relation to FIG. 3. Alternatively, the firing chambers may be formed at a subsequent point in the processing.

In one embodiment, one or more protective layer(s) or coating(s) 402 is positioned over barrier layer 316a. Protective layer 402 is intended to physically protect the underlying layers during laser processing. Among other functions, protective layer 402 can protect the underlying layers from debris produced during laser machining. Without protective layer 402, such debris can become trapped in the underlying layers and cause fluidic and/or electrical failure. For example without protective layer 402, debris produced during laser processing can become lodged in the fluid-feed passageways 322 as described in FIG. 3. The debris can subsequently occlude or obstruct ink flow through the affected passageways resulting in a malfunction during printing. Suitable protective layer materials can be applied before laser processing and removed after laser processing.

Suitable protective layer materials can include various polymers such as thermoplastics and cross-linking polymers among others. In one embodiment, protective layer 402 comprises polyvinyl alcohol. Other suitable materials for protective layers can include but are not limited to polyvinyl acetate, polyethylene oxide, and polyethyleneterathalate, among others.

Processing techniques which utilize optical alignment equipment can utilize materials such as polyvinyl alcohol which allow sufficient optical transmission for the equipment to operate. For example, where optical alignment equipment is utilized to locate fiducial markings on the print head the protective layer should allow sufficient light transmission for proper equipment functioning.

Protective layer 402 can be formed from a polyvinyl alcohol water solution that is commercially available from ATMI. The solution can be applied and then dried before laser processing. Upon completion of laser processing pressurized water and/or mechanical means such as brushing in the presence of water can be utilized to remove the protective layer. Protective layer 402 can be applied utilizing any suitable technique. In one embodiment protective layer 402 is spun-on. Other suitable embodiments may apply the protective layer by laminating, dip coating, electrocoating, sputter coating or spray coating, among other processes. In one embodiment, thin-films 314a, barrier layer 318a and protective layer 402 comprise layer assembly 307a.

A laser beam 404 is directed at substrate 300a. Any suitable laser beam configured to remove substrate material can be utilized. Laser beam 404 is directed through the substrate's first surface 302a from a direction sufficient to contact first surface 302a before contacting the second surface 303a. Laser beam 404 is directed at a laser machining region 406 of substrate material and the laser energy removes substrate material so that laser machining region 406 progressively moves toward second surface 303a. The removed substrate material defines a feature 408 having a generally uniform width w throughout its depth d as defined between sidewalls 410, 412. In other embodiments, the width of the feature may vary along its depth d.

In some implantations laser machining region 406 can be defined laterally as extending between sidewalls 410, 412. In other embodiments, laser machining region 406 can include substrate material defining sidewalls 410, 412 that was directly affected but not removed by the laser beam. In some embodiments, the laser machining region may be defined to include substrate material proximate the feature but not removed by the laser machining process. In some of these embodiments the laser machining region may be in the range of 1-10 microns wider than feature width w and include what can be known as a "heat affected zone".

Figure 4B:
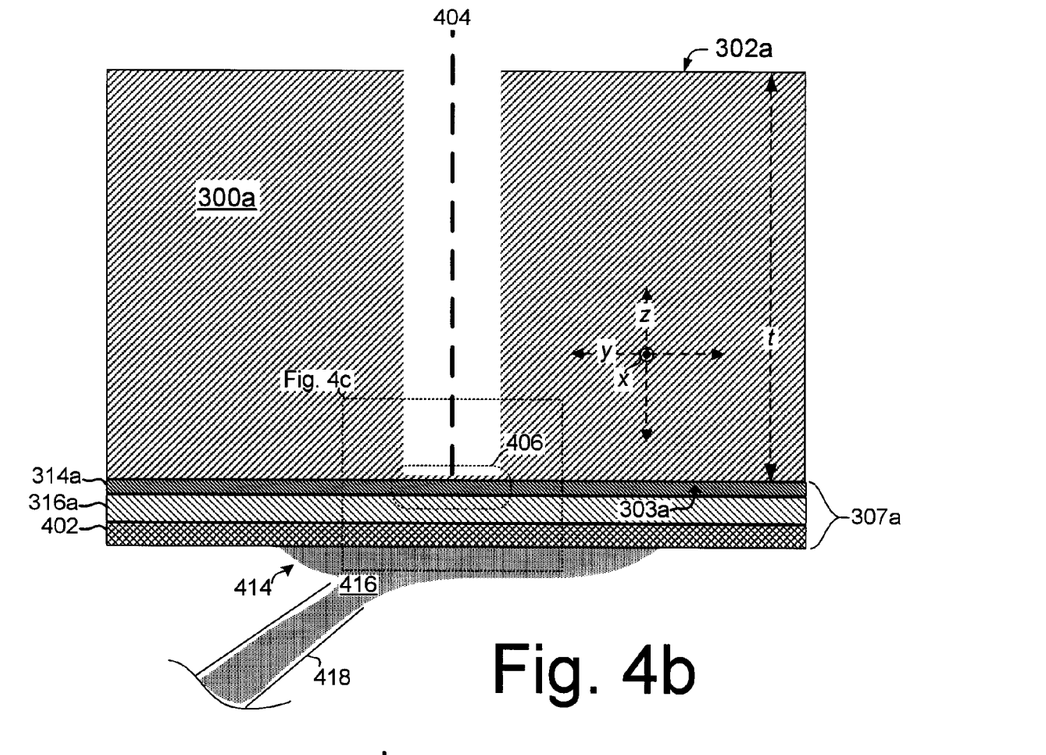
Figure 4C:
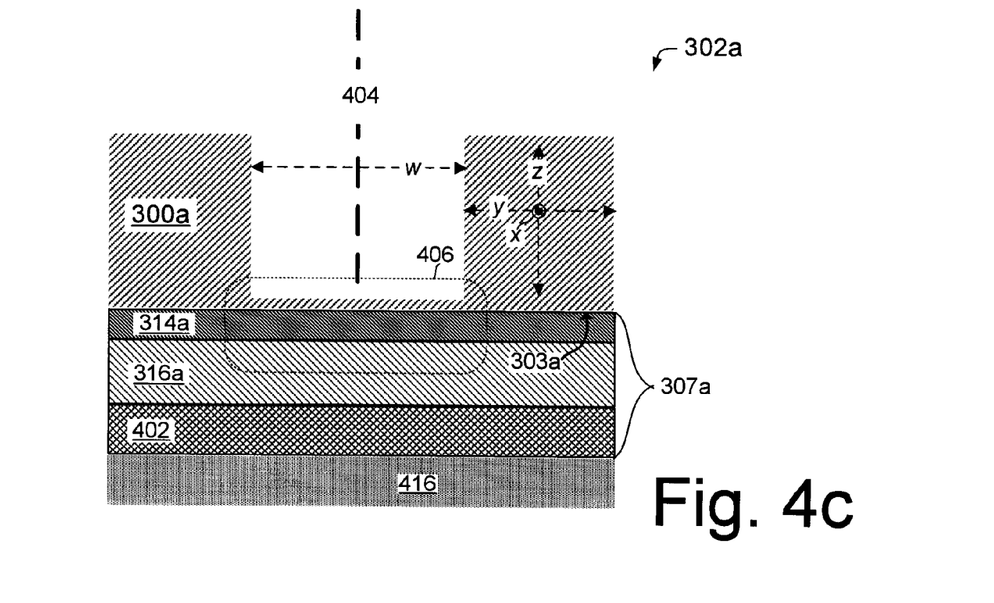

Referring now to FIGS. 4b-4c where laser beam 404 approaches "break-through" of second surface 303a. FIG. 4c illustrates an enlarged region of the substrate illustrated in FIG. 4b. As shown in FIGS. 4b-4c, laser machining region 406 now comprises substrate material defining second surface 303a and portions of layer assembly 307a. At this point in the laser machining process, with previous technologies, laser energy directed at laser machining region 406 may unintentionally be transferred to substrate material and/or layer assembly 307a outside of laser machining region 406. Such energy transfer can damage thin-film layers 314a among others. Such energy transfer can damage regions of the thin-films or other components of the layer assembly 307 that are located from about 10 microns to about 125 microns away from the laser machining region. Thus, some of the unintended energy transfer can damage portions of the layer assembly 307a at locations an order of magnitude beyond the heat affected zone.

The described embodiments reduce or eliminate damage caused by unintended energy transfer by supplying an electrically conductive material 414 proximate second surface 303a during at least a portion of the laser machining process. Suitable electrically conductive materials 414 can include fluids and solids among others. Several exemplary materials and methods of use are described below.

As illustrated in FIGS. 4b-4c the present embodiment reduces or eliminates damage to the layer assembly 307 by supplying an electrically conductive material 414 comprising fluid 416. The fluid is directed toward second surface 303a. Fluid 416 can itself be conductive and/or can contain material(s) which makes the fluid conductive. In this embodiment, the fluid comprises ionized water having a conductivity of about 100 micro Siemens per centimeter and delivered as atomized water droplets. The ionized water is delivered at a rate of about 8 milliliters/minute.

Many other suitable fluids 416 can be utilized in various embodiments. In one such example, a highly viscous and/or tacky liquid may be utilized which will may adhere to the layer assembly for a prolonged period of time during processing and as such may be supplied periodically rather than generally continuously during laser processing. Other suitable conductive fluids can comprise gases having sufficient rates of conductivity. For example, some embodiments may utilize supersaturated gases or vapors as the conductive fluid.

Any suitable delivery mechanism can be utilized to supply conductive fluid 416. In one embodiment conductive fluid 416 is supplied from an atomizing nozzle 418 and from a direction sufficient to contact first surface 302a before contacting the second surface 303a.

Various other types of delivery means can be utilized to supply conductive fluid 416. For example, in one embodiment, conductive fluid 416 flows across at least portions of layer assembly 307a. Another embodiment immerses portions of the substrate 300a and layer assembly 307a in conductive fluid 416. In addition to atomizing nozzle 418, other suitable nozzle means can be utilized to direct the conductive fluid toward second surface 303a.

Several mechanisms have been proposed to explain the damage associated with previous laser machining technologies, and other explanations may be forthcoming. One explanation proposes that at break-through of second surface 303a, laser beam 404 creates localized electrostatic charges on layer assembly 307a outside of laser machining region 406. The electrostatic charges are unable to sufficiently dissipate and as a result accumulate until sudden catastrophic electrostatic discharges ensue within the layer assembly. The catastrophic electrostatic discharges can have an intensity sufficient to damage some of the component layers such as the thin-films, e.g. by causing breakdown of dielectric layers formed between conductive layers. Supplying the conductive material to layer assembly 307a allows charges to dissipate as they are generated and thus reduces the likelihood of catastrophic electrostatic discharges and other problems caused by excessive charge accumulation.

Experimental evidence indicates that damage to layer assembly 307a outside of laser machining region 406 can be reduced or eliminated by supplying conductive material 414 to layer assembly 307a during at least a portion, e.g. when laser beam 404 is approximately half way through thickness t of substrate 300a, of the laser machining process. In other embodiments, the conductive material can be supplied during a period associated with breakthrough of a substrate surface over which the layer assembly is positioned. In additional embodiments, conductive material can be supplied prior to and during the application of laser beam 404.

Figure 4D:
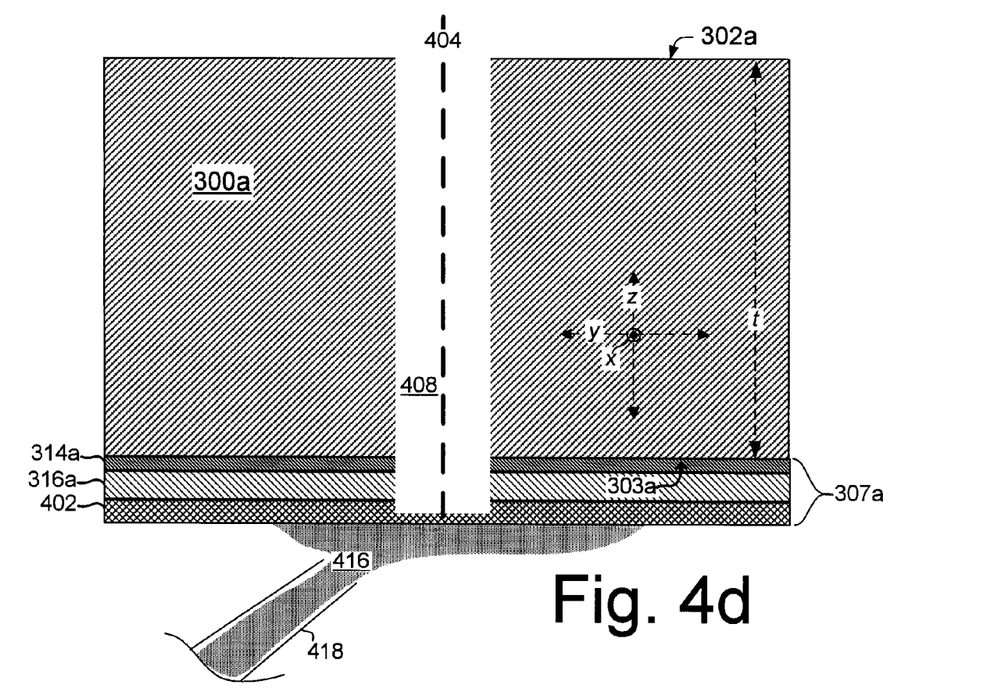

Referring now to FIG. 4d which shows laser beam 404 nearing completion of the laser machining process. Laser beam 404 is removing material from layer assembly 307a in the process of forming feature 408.

Figure 4E:
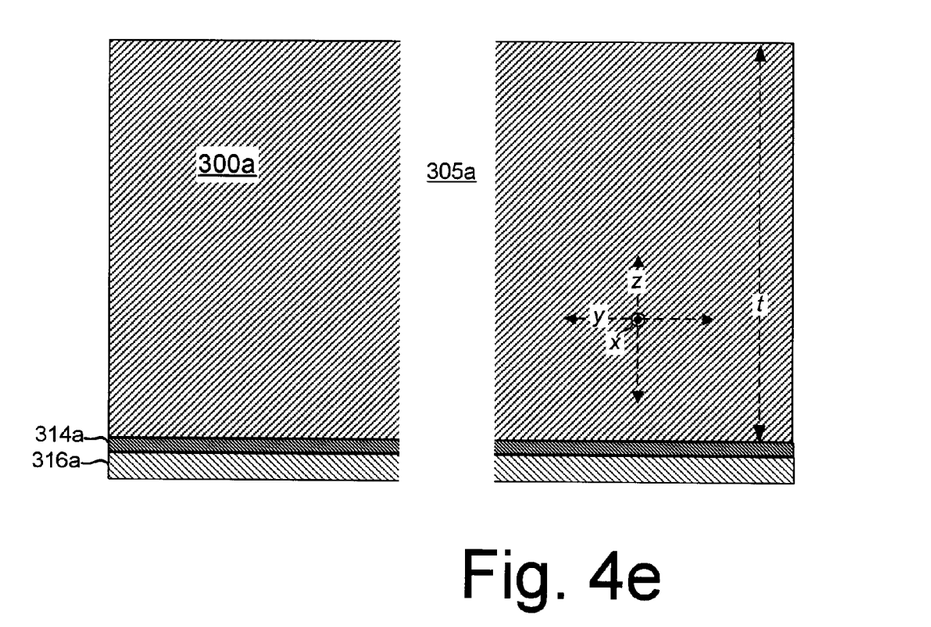

FIG. 4e shows the resultant substrate upon completion of the laser machining process. Feature 408 as described above, now passes through the entire substrate 300a, thin-films 314a and barrier layer 316a and as such now comprises slot 305a. Protective layer 402 described above has been removed subsequent to laser processing by known techniques.

Figure 4F:
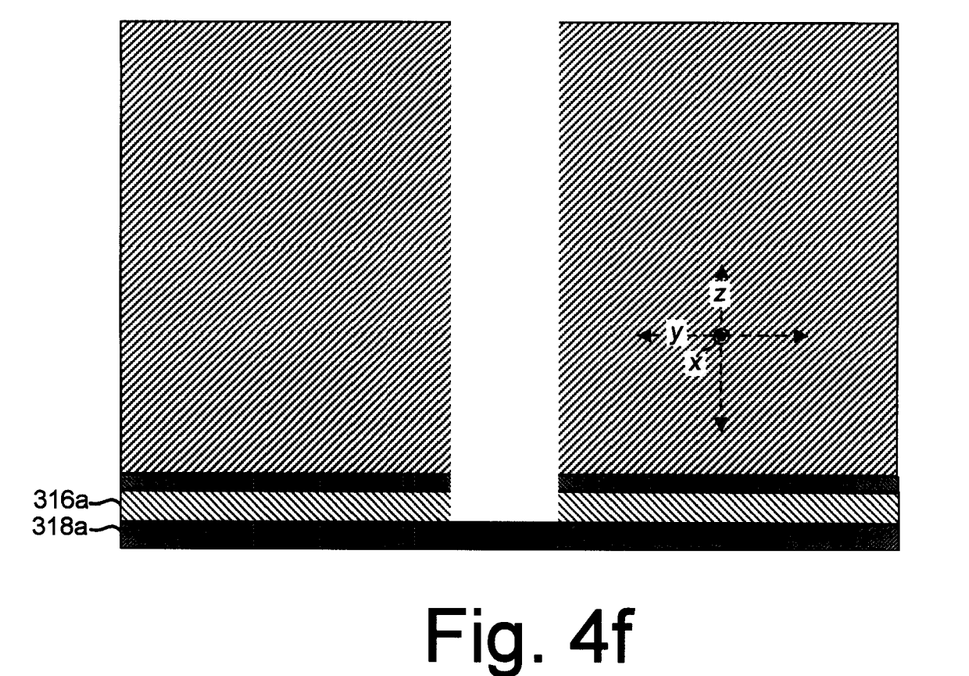

Referring now to FIG. 4f which shows a subsequent processing step where orifice layer 318a is positioned over barrier layer 316a in a known manner.

Figure 5A:
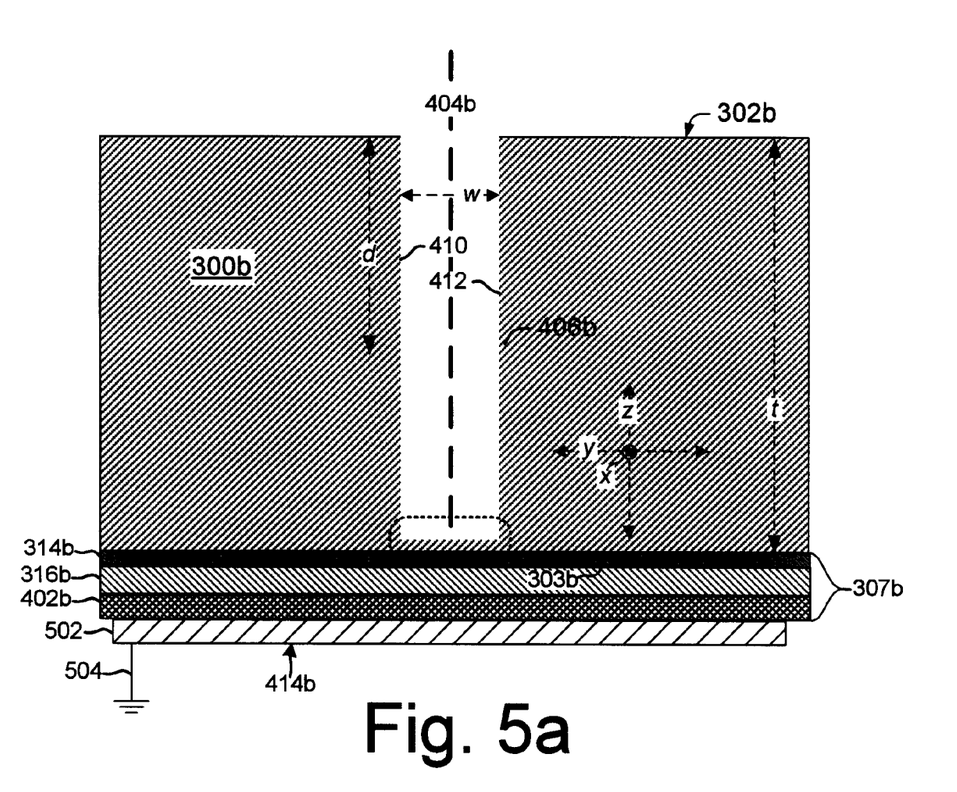
FIG. 5a illustrates a diagrammatic representation of a process step for laser processing an exemplary slotted substrate in accordance with one embodiment.

FIG. 5a illustrates an alternative production technique for producing an exemplary print head similar to that produced in FIGS. 4a-4f. Production of an exemplary print head begins with substrate 300b which is prepared in a manner similar to that described above in relation to FIG. 4a. Various thin-film layers 314b are positioned over second surface 303b in a manner known in the art to form various electrical components. Positioned over thin-films 314b is barrier layer 316b. A protective layer or coating 402b is positioned over barrier layer 316b. Protective layer 402b is intended to physically protect the underlying layers during processing.

A conductive material 414b in the form of conductive layer 502 is positioned over protective layer 402c. Conductive layer 502 can perform a function similar to conductive fluid 416 described above. Accordingly, conductive layer 502 can reduce the damage induced by the transferred laser energy beyond the laser machining region. By reducing the incidence of energy transfer outside the laser machining region, such as at breakthrough, damage to thin-films 314b can be reduced or eliminated.

In one embodiment, conductive layer 502 comprises a metal foil positioned over protective layer 402b. In one embodiment, the foil is electrically coupled to a grounded probe 504. Also, in this embodiment, conductive fluid can be sprayed on protective layer 402b before conductive layer 502 is positioned thereon to decrease any resistance to electrical flow between the layers.

Other suitable conductive layers 502 can comprise a metal or otherwise conductive mesh. Still other conductive layers may not be conductive in a stand alone environment, but may perform satisfactorily in different embodiments. For example, a generally non-conductive porous material may be applied over protective layer 402b. Prior to laser machining, a conductive liquid may be sprayed on or otherwise supplied to the porous material to create a conductive layer during laser processing. While the embodiment shown utilizes a single conductive layer 502, other suitable embodiments may use multiple layers.

Still other embodiments may utilize a conductive layer 502 comprising a gel. In one such embodiment, a hydrophilic material can be applied at a convenient time during processing and then ionized water can be supplied to the hydrophilic material prior to laser processing. Such an embodiment may allow the conductive liquid to be supplied during a convenient processing step and eliminate supplying the conductive liquid during laser processing.

A laser beam, such as laser beam 404b can be directed at the first and/or second surfaces 302b, 303b to remove material in a known manner. Upon completion of laser processing, conductive layer 502 can be removed. In some embodiments, conductive layer 502 can be removed with the same process that removes underlying protective layer 402b.

Figure 6A:
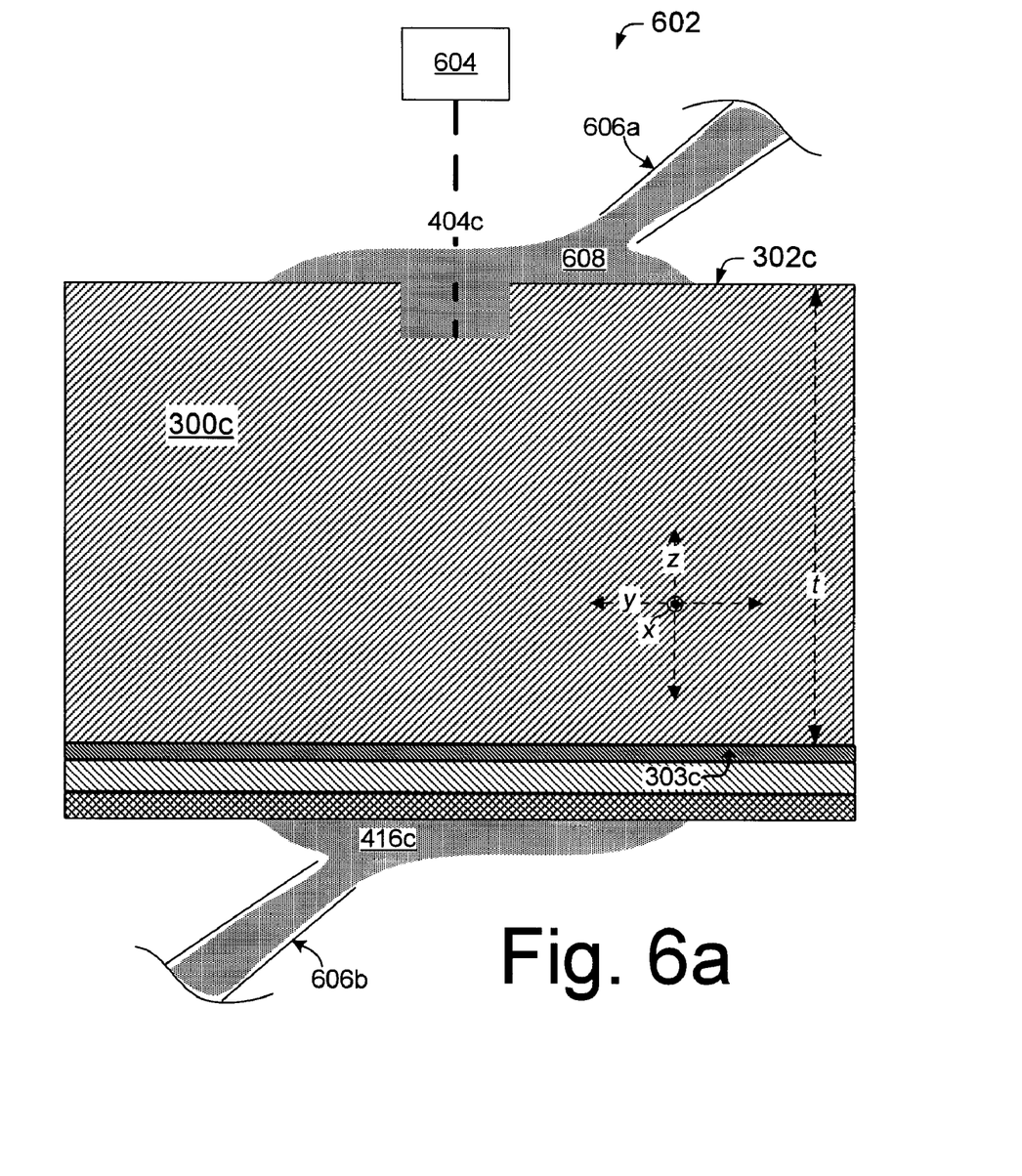
FIG. 6a illustrates a diagrammatic representation of a process step for laser processing an exemplary slotted substrate in accordance with one embodiment.

Referring now to which FIG. 6a which shows another alternative embodiment similar to that described above in relation to FIGS. 4a-4f. FIG. 6a shows a substrate processing device indicated generally at 602 and configured to laser machine substrate 300c. A means for generating optical energy configured to remove substrate material is embodied as laser source 604.

Laser source 604 directs laser beam 404c toward first surface 302c from a direction sufficient to contact the first surface before contacting second surface 303c. A first fluid supply structure 606a supplies fluid in the form of water 608 toward first surface 302c and from a direction sufficient to contact the first surface before contacting second surface 303c. First fluid supply structure 606a supplies water 608 during laser processing primarily to aid in the substrate removal process.

A second fluid supply structure 606b supplies conductive fluid 416c toward substrate 300c. In this instance second fluid supply structure 606b is configured to supply conductive fluid 416c in the form of ionized liquid water toward second surface 303c from a direction sufficient to contact second surface 303c before contacting first surface 302c. Second fluid supply structure 606b supplies conductive fluid 416c primarily to minimize damage to a layer assembly 307c positioned over second surface 303c and not primarily to aid in material removal.

The reader is now directed to FIGS. 7a-7d which illustrate exemplary production techniques for dicing a wafer into individual integrated circuits.

Figure 7A:
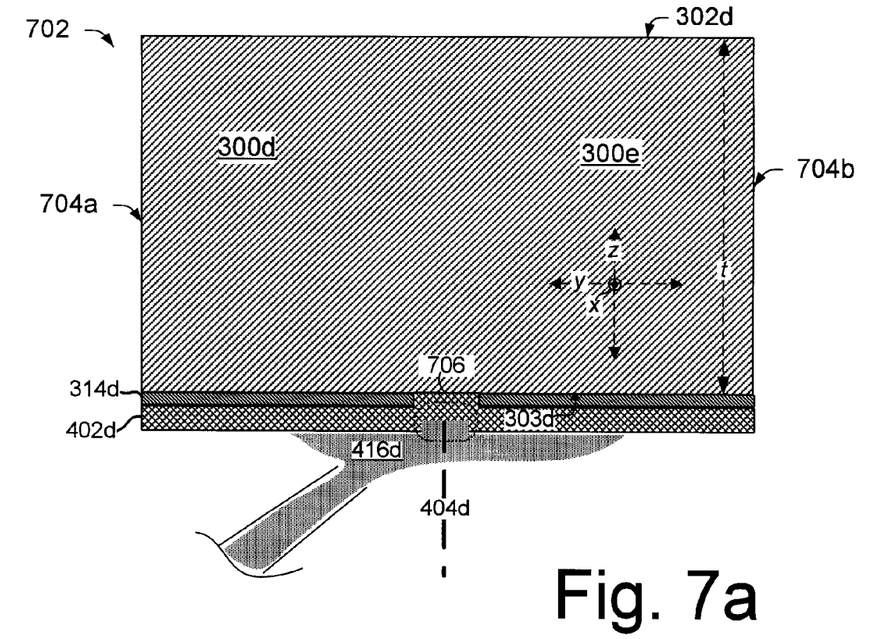
FIGS. 7a-7d illustrate diagrammatic representations of process steps for laser processing to separate individual substrates in accordance with one embodiment.

Referring now to FIG. 7a, laser beam 404d is directed toward wafer 702 to separate or dice the wafer into separate and distinct subunits comprising integrated circuits 704a, 704b which comprise substrates 300d, 300e respectively. Laser beam 404d is specifically directed toward a street 706 upon which no thin-films 314d are formed and which separates individual integrated circuits comprising wafer 702. In a prior process step protective layer 402d was positioned over second surface 303d to protect the thin-films 314d during processing.

Conductive liquid 416d is being supplied to portions of the protective layer 402d including the laser machining region 406d while laser beam 404d removes material from protective layer 402d. In this instance, conductive fluid 416d is being supplied primarily to protect the thin-films 314d and not primarily to aid in the removal process such as by increasing the rate of removal achieved by the laser.

Figure 7B:
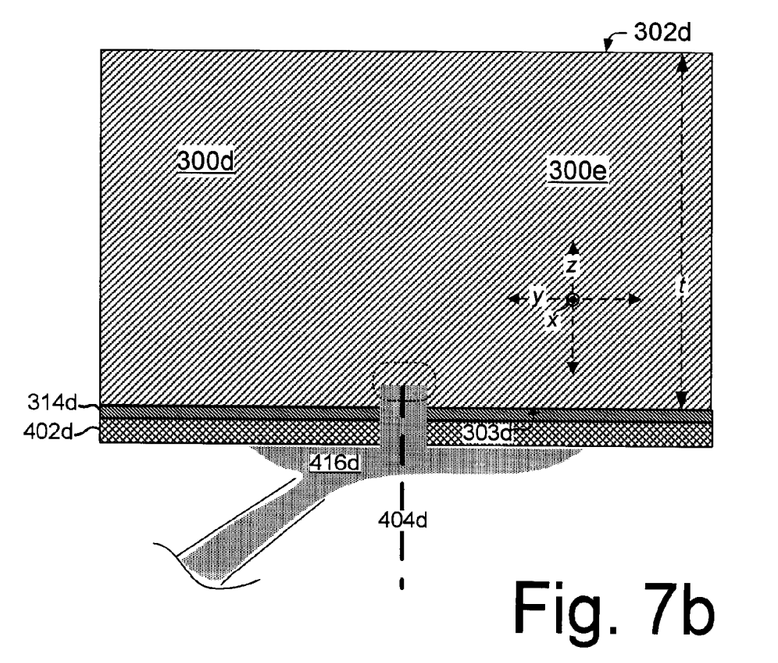

Referring now to FIG. 7b, laser beam 404d has passed through protective layer 402d and is removing substrate material comprising second surface 303d of the substrates 300d, 300e. Conductive fluid 416d is still being applied at this point in the processing to protect the thin-films from degradation.

Figure 7C:
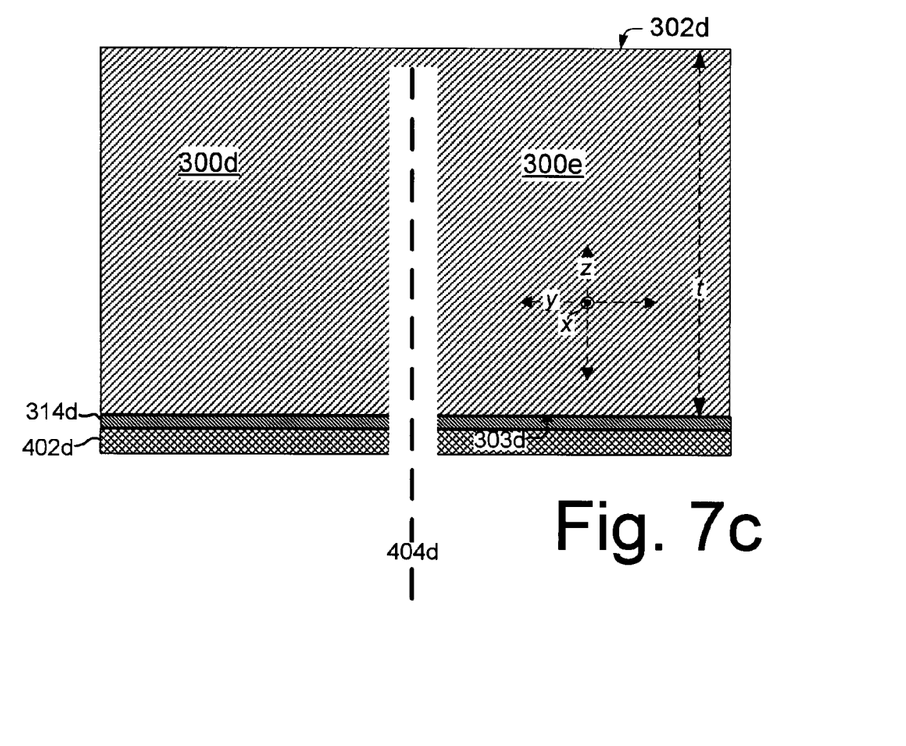

Referring now to FIG. 7c where laser beam 404d is continuing to remove substrate material and is now proximate to first surface 302d. In one embodiment, conductive fluid 416d is no longer being supplied at this point in the laser processing. Other embodiments may supply conductive fluid 416d for an entirety of laser machining operations.

Figure 7D:
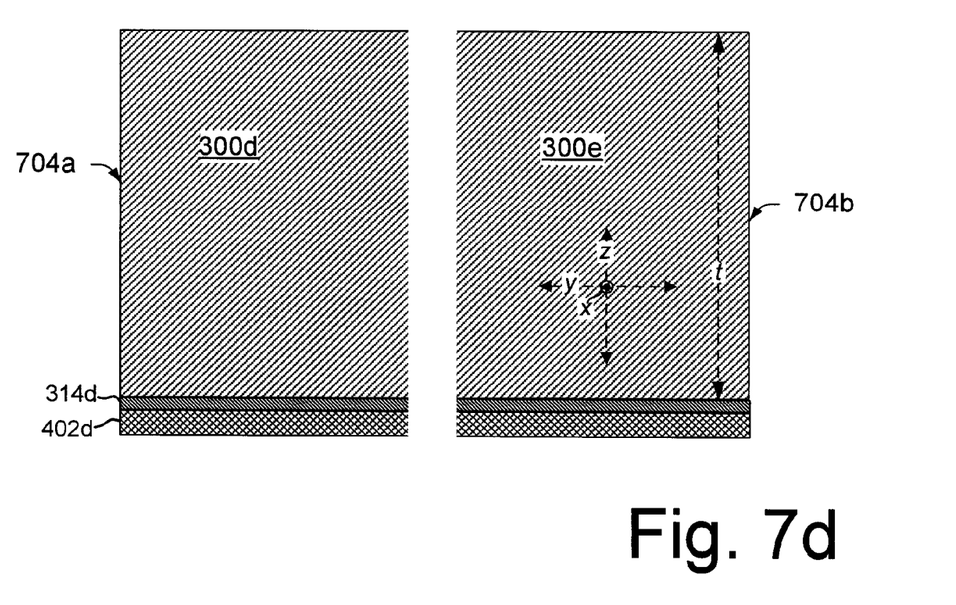

Referring now to FIG. 7d which shows the singulated integrated circuits 704a, 704b. Protective layer 402d can now be removed in a known manner.

The laser machining process described in relation to FIGS. 7a-7d allows wafers to be singulated into individual integrated circuits while minimizing damage to thin-films and/or other layers positioned upon the wafer during processing. Such a process can be especially valuable by allowing the laser removal process to be used in relative proximity to thin-film elements such as resistors and transistors without damaging those elements. As such some embodiments may allow streets to have a reduced width and save real estate on the wafer.

It should be noted that the energy to be dissipated by the conductive material is a function of the laser energy provided and the properties of the material being ablated. Since the charge generated can be measured by applying a laser having the desired energy, e.g. pulse energy in the case of a pulse laser, and then measuring the charge concentration at one or more positions, e.g. by use of a charge probe, at locations that correspond to the location of components or areas where damage may occur. Based upon these measurements of charge concentration, ranges of conductivities for a conductive material may be determined that substantially reduce charge concentrations formed during laser ablation.

Although specific structural features and methodological steps are described, it is to be understood that the inventive concepts defined in the appended claims are not necessarily limited to the specific features or steps described. Rather, the specific features and steps are disclosed as forms of embodiments of the inventive concepts.

What is claimed is:

1. A print head formed by:
   providing a substrate having a first substrate surface and a second substrate surface opposite the first substrate surface, the second substrate surface having a layer assembly positioned thereon;
   removing material of the substrate from the first substrate surface to the second substrate surface and material of the layer assembly from each layer thereof by directing a laser beam at the first substrate surface; and,
   during at least a portion of said removing, supplying a conductive liquid proximate a surface of the layer assembly.

2. The print head of claim 1, wherein said act of supplying comprises directing liquid droplets toward the surface of the layer assembly.

3. The print head of claim 1, wherein said act of supplying comprises directing a stream of liquid at the surface of the layer assembly.

4. A print head formed by:
   removing substrate material between a first substrate surface and a second generally opposing substrate surface by directing a laser beam at the first substrate surface; and,
   during at least a portion of said removing, supplying a conductive liquid proximate the second substrate surface, wherein said act of supplying comprises immersing at least a portion of the second substrate surface in the conductive liquid.

5. An integrated circuit formed by:
   directing a laser beam at a substrate to form a feature through the substrate and through a layer assembly positioned on the substrate; and,
   during at least a portion of said directing, supplying a fluid proximate the layer assembly primarily to protect the layer assembly and not primarily to aid in forming the feature.

6. The integrated circuit of claim 5, wherein the act of supplying the fluid comprises supplying a conductive liquid proximate a surface of the layer assembly.

7. The integrated circuit of claim 5, wherein the layer assembly comprises at least one patterned conductive layer and at least one patterned dielectric layer.

8. A print head formed by:
   forming a feature into a substrate and a layer assembly positioned on the substrate, at least in part, by directing a laser beam at a laser machining region extending through the substrate and the layer assembly; and,
   during at least a portion of said directing, supplying a conductive liquid proximate the layer assembly primarily to protect portions of the layer assembly and not primarily to aid in forming the feature.

9. The print head of claim 8, wherein said act of supplying protects portions of the layer assembly outside the laser machining region at which the laser is directed.

10. The print head of claim 8, wherein said act of supplying protects portions of the layer assembly by dissipating electrostatic charges from localized areas of the layer assembly.

11. The print head of claim 8, wherein said act of supplying decreases an incidence of laser energy being unintentionally transferred to portions of the layer assembly distal the feature.

12. The print head of claim 8, wherein said act of forming comprises first directing the laser beam at substrate material proximate a first substrate surface and second directing the laser beam at substrate material intermediate the first substrate surface and a second substrate surface and third directing the laser beam at substrate material proximate the second substrate surface and wherein the layer assembly is positioned over the second substrate surface.

13. The print head of claim 12, wherein said act of supplying further comprises supplying the conductive liquid proximate the first substrate surface.

14. The print head of claim 12, wherein said act of supplying further comprises supplying the conductive liquid proximate the second substrate surface.

15. The print head of claim 12, wherein said act of supplying further comprises supplying the conductive liquid proximate the first substrate surface and the second substrate surface.

16. The print head of claim 8, wherein said act of supplying comprises supplying ionized water.

17. The print head of claim 8, wherein said act of supplying comprises supplying a gelatinous liquid.

18. An apparatus comprising:
    a laser source for generating a laser beam configured to remove material from a substrate and a layer assembly positioned on the substrate; and,
    a liquid supply structure configured to supply a conductive liquid proximate a surface of the layer assembly to reduce development of localized electrostatic charge differentials on the layer assembly while the laser beam operates on at least a portion of a laser machining region extending through the substrate and the layer assembly to remove material from the substrate and the layer assembly.

19. An integrated circuit formed by:
    positioning a conductive material over a layer assembly positioned on a substrate, the layer assembly including one or more thin-films; and,
    forming a feature through the substrate and the layer assembly by directing a laser beam at the substrate;
    wherein the conductive material protects portions of the thin-films lying outside the feature from being damaged by the laser beam.

20. The integrated circuit of claim 19, wherein the conductive material reduces a build-up of laser energy in the portions of the thin-films lying outside the feature.

21. The integrated circuit of claim 19, wherein the conductive material reduces redirection of laser light at the portions of the thin-films lying outside the feature.

22. The integrated circuit of claim 19, wherein said act of positioning comprises positioning a conductive layer over the layer assembly.

23. An integrated circuit formed by:
    directing a laser beam at a substrate to remove material therefrom, and,
    supplying a conductive material toward the substrate to protect one or more thin-film layers positioned over the substrate, wherein said act of supplying comprises sputtering a metal layer over the substrate.

24. An integrated circuit formed by:
    directing a laser beam at a substrate to remove material therefrom, and,
    supplying a conductive material toward the substrate to protect one or more thin-film layers positioned over the substrate, wherein said act of supplying comprises supplying a conductive layer.

25. An integrated circuit formed by:
    directing a laser beam at a substrate to remove material therefrom, and,
    supplying a conductive material toward the substrate to protect one or more thin-film layers positioned over the substrate, wherein said act of supplying comprises positioning a conductive layer over the one or more thin-film layers, and wherein said conductive layer is positioned prior to said act of laser machining.

26. The integrated circuit of claim 25, wherein said act of supplying comprises supplying a conductive liquid and wherein the conductive liquid is supplied during at least a portion of the act of directing.

27. The integrated circuit of claim 25, wherein said act of supplying comprises supplying the conductive material as a component of a generally insulative protective layer positioned over the one or more thin-film layers.

28. The integrated circuit of claim 25, wherein said act of supplying comprises sputtering the conductive material over a generally insulative protective layer positioned over the one or more thin-film layers.

29. The integrated circuit of claim 25, wherein said act of positioning comprises positioning the conductive layer directly over and in contact with the one or more thin-film layers.

30. The integrated circuit of claim 25, wherein said act of positioning comprises positioning the conductive layer over another different layer that is positioned over the one or more thin-film layers.

31. An integrated circuit formed by:
positioning at least one thin-film layer over a substrate;
positioning a generally electrically insulative protective layer over the at least one thin-film layer;
positioning a generally electrically conductive material over the protective layer; and
removing the electrically insulative protective layer and the generally electrically conductive material at a subsequent processing step.

32. An integrated circuit formed by:
positioning at least one thin-film layer over a substrate;
positioning a generally electrically insulative protective layer over the at least one thin-film layer; and,
positioning a generally electrically conductive material over the protective layer,
wherein said act of positioning a generally electrically conductive material comprises sputtering a metal over the protective layer.

* * * * *